Aug. 30, 1949.  E. A. BODKIN  2,480,628
REMOVAL OF ZEOLYTIC ALKALI FROM GELS
Filed July 24, 1946
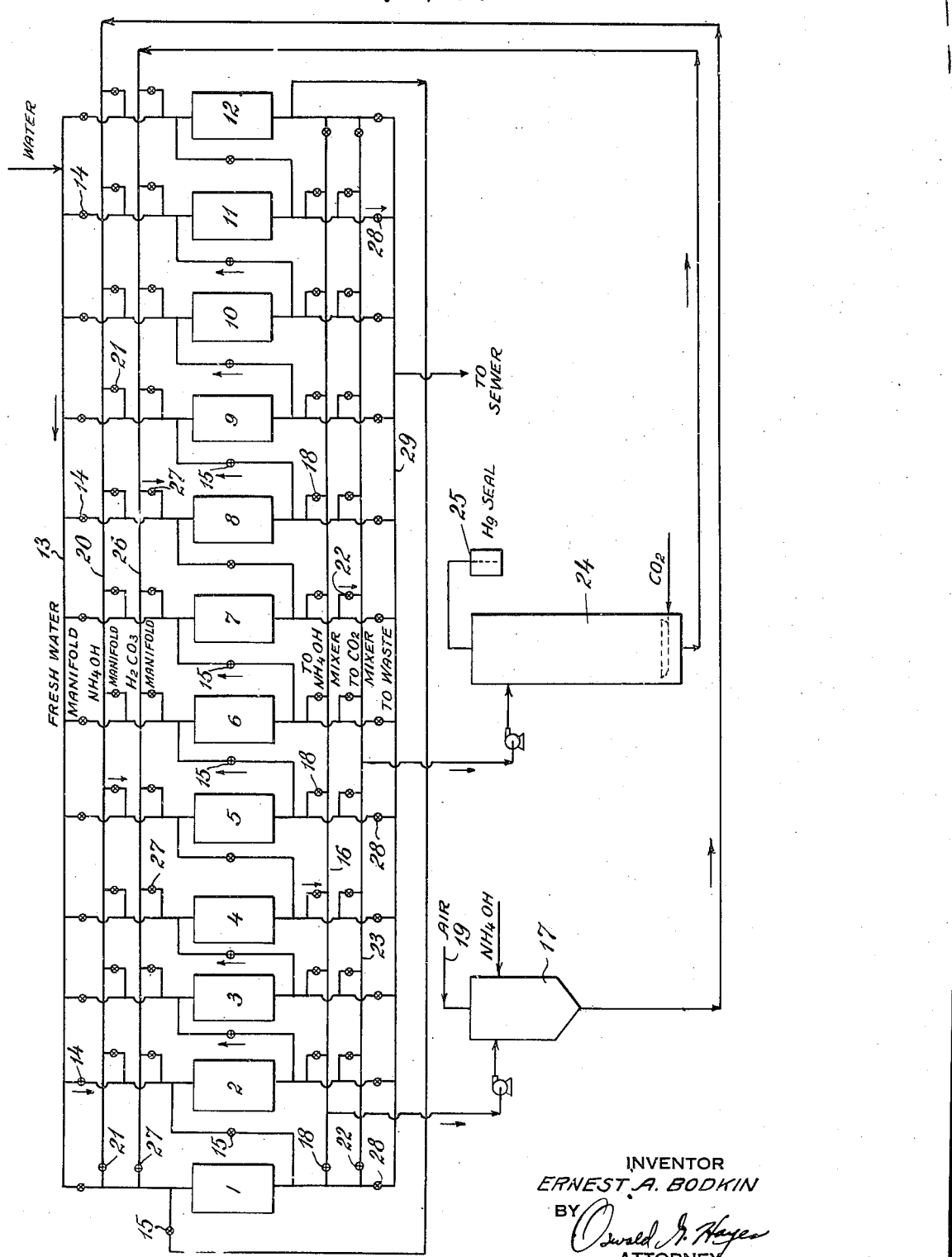
INVENTOR
ERNEST A. BODKIN
BY
ATTORNEY Patented Aug. 30, 1949

2,480,628

UNITED STATES PATENT OFFICE 2,480,628

REMOVAL OF ZEOLYTIC ALKALI FROM GELS

Ernest A. Bodkin, Pitman, N. J., assignor to Socony-Vacuum Oil Company, Incorporated, a corporation of New York Application July 24, 1946, Serial No. 685,834

1 Claim. (Cl. 252—455)

This invention relates to a process for treating inorganic oxide gels with aqueous solutions and to the treated products so prepared.

The preparation of inorganic oxide gels for such purposes as catalysis, adsorption and the like generally requires purification to remove matter foreign to the basic gel structure. The water soluble salts resulting from the reaction by which the gel is produced may be washed out quite readily with water, but gels formed by the use of water glass at pH values greater than about 2 to 3 normally contain such impurities as zeolytic sodium which cannot be adequately removed by water washing over any practicable period of time. The zeolytic impurities are removable by a base exchange reaction, substituting for the impurity, another ion or radical which is either desirable, innocuous or readily removable. The nature of the zeolytic constituents can be best understood by reference to exemplary compositions such as catalysts and desiccants.

A silica-alumina gel can be employed as a catalyst for the cracking of hydrocarbons in a cyclic process including a reaction stage in which the charge hydrocarbon is converted to a lower boiling hydrocarbon with concurrent deposition of a carbonaceous contaminant on the catalyst. The carbonaceous deposit seriously impairs the efficiency of the catalyst. Catalytic activity is then restored by burning the deposit in a regeneration stage and the catalyst is returned to the reaction stage. Alkali metals have a detrimental effect on such catalysts in that the activity drops rapidly over a series of cycles, apparently because the alkali metal induces a change in the catalyst during the high temperature regeneration stage. The gel is generally formed by reaction of dilute water glass with aluminum sulfate or sodium aluminate solution and contains substantial quantities of zeolytic sodium. The sodium ions may be largely replaced by base exchange with metal salts to introduce a desirable metal ion such as aluminum, zirconium, beryllium, etc., with aqueous ammonia which can later be decomposed by heat to evolve ammonia gas; or with hydrogen ions from acid solutions.

Similar considerations apply to the manufacture of desiccants. Silica gel formed at pH 1 or thereabouts may be washed free of substantially all impurities, including sodium, by passing water through a bed of hydrogel granules for two or three days. However, the modern techniques of gel formation to obtain smooth surfaced particles require a hydrogel having a pH value of 2 or greater for economical operation since the short gelation times are only obtainable at these higher pH values. The gels so formed contain sodium which is not removed by water washing over a practicable period of time. Theoretically, it may be postulated that water washing will exchange hydrogen for sodium in the gel; but, so far as is known, this has not been demonstrated. If such exchange is possible, the low hydrogen ion content of water alone makes it likely that very long periods of time would be required; perhaps a year or more of washing.

The present invention relates to a process for the preparation of valuable dry gels from inorganic oxide hydrogels by base exchanging the hydrogel with a weak acid such as acetic, boric, citric, carbonic and the like. Strong acids tend to dissolve out metal oxides such as alumina and the like which are essential to cracking catalysts and are advantageously employed in the manufacture of desiccants and the like in small amounts to reduce breakage during processing and drying. This effect can be overcome by using dilute solutions having pH values on the order of 2 or more, but the amount of hydrogen ions available for base exchange in such case is so small that inordinately long washing periods are required. The present invention, utilizing aqueous solutions of weak acids gives pH values sufficiently low to avoid leaching out desirable metal oxides and also provides a source of available hydrogen as un-ionized acid which slowly ionizes as hydrogen ions are consumed by base exchange.

The action of these weak acids may be capable of explanation based on the size of the pores in the gel under treatment. The rate of diffusion into the fine capillaries of the gel is necessarily very slow. If a strong acid is used at such dilution as to avoid leaching out of desirable metal oxides, the number of hydrogen ions entering a capillary over a practicable period of time is insufficient to remove a suitable amount of alkali metal ions by base exchange. By way of contrast, a more concentrated solution of a weak acid may be used without seriously affecting the concentration of desirable metal oxide in the gel. This solution penetrates the pores and, as hydrogen ions are consumed by base exchange, the concentration thereof in the solution is maintained by ionization of the weak acid. In this manner, it may be assumed that the weak acid is capable of supplying sufficient hydrogen ions to remove alkali metals by base exchange without using a solution of sufficient acidity to leach out polyvalent metal oxides forming part of the gel structure.

The weak acids used according to the present invention are those having ionization constants not substantially greater than $1 \times 10^{-3}$. The acidity of the solution should not be substantially greater than pH 2.5 and is preferably below pH 3.5. The step of base exchange with a weak acid may be part of a complete process in which the gel is also washed with another base exchange agent such as aqueous solutions of ammonium and polyvalent metal compounds. Improved results are thereby frequently obtained. For some reason that is not understood, base exchange with two dissimilar base exchange agents in series is often more efficacious than a treatment of comparable nature (as to time of treatment and concentration of treating solution) with either of the base exchange agents.

The process of treating gels for removal of alkali metals by base exchange according to the present invention is applicable to hydrogels and also to gels which have been previously dried. As to the latter, it is desirable that measures be taken to prevent breakage of the dry gel on immersion in water or aqueous treating solutions. This may be accomplished by wetting the gel first with a liquid which does not induce breakage, such as hydrocarbon liquids, alcohol, concentrated solutions of organic compounds such as sugar, and the like. The non-breaking liquid is then replaced by the aqueous treating liquid in such manner as may be necessary as by immersing gel wet with water miscible liquid directly in water or the treating solution. Gels wet with water immiscible liquids must be transferred to water in stages; for example, kerosene to acetone to water.

An even more satisfactory method for wetting is to impregnate the dry gel with a gas which is readily taken up by aqueous solutions, such as steam, carbon dioxide or ammonia. The latter two are particularly desirable when the gel is to be treated with carbonic acid or ammonium hydroxide, respectively. The saturation of the gel with the gas corresponding to the aqueous treating solution appears to condition the gel and render it more amenable to treatment.

The invention is well adapted to preparation of gel type cracking catalysts composed primarily of silica and one or more polyvalent metal oxides; and the detailed description herein will be directed to production of such materials, it being understood that the principles hereof are equally applicable to all gel-type materials regardless of their intended use as desiccants, catalysts, adsorbents, etc.

EXAMPLE I

One specific embodiment of the invention contemplates reduction in alkali metal content of a silica alumina cracking catalyst formed by reaction of water glass and aluminum sulfate; for example, as disclosed in U. S. Patent No. 2,384,946, issued September 18, 1945, to Milton M. Marisic. The gel is washed with carbonic acid, aqueous ammonia and water in series. If the gel has been previously dried, it is first impregnated with carbon dioxide and then immersed in the treating solution. Apparatus for that process is shown in the annexed drawing which shows, diagrammatically, apparatus for continuous countercurrent washing of gel in a plurality of vessels in series.

A plurality of washing vessels, numbered 1 to 12, inclusive, are provided for contacting the gel with aqueous treating and washing agents. The effect of countercurrent contact between gel and aqueous medium is obtained by passing water in series through a number of vessels, say ten, containing gel which has been in the washing stream for successively shorter periods. Periodically, the first washing vessel (containing gel which has been in the washing cycle for the greatest period of time) is taken out of the cycle, the succeeding vessel is made the first and a vessel of unwashed gel is added at the end.

In a typical operation, bead hydrogel, prepared according to the above mentioned Marisic patent, is washed in a series of ten vessels, say numbers 2 to 11, inclusive, of the drawing. The gel in vessel 2 has been in the washing cycle the greatest period of time, with the succeeding vessels containing gel of successively lesser age. In each vessel, aqueous wash liquid is supplied at the top and withdrawn at the bottom.

Fresh wash water is supplied to manifold 13 having twelve branch lines to the twelve vessels, each fitted with a suitable valve 14. In the operation stated, valve 14 for vessel 2 is open and the other valves 14 are closed. Transfer lines controlled by valves 15 connect a discharge at the bottom of each vessel with the inlet at the top of the succeeding vessel. The valve 15 preceding vessel 2 is closed while those following vessels 2 and 3 are open with the valve 15 following vessel 4 closed. Thus, the fresh water flows in series through vessels 2 to 4 and is then diverted to header 16 for supplying an ammonia mixing tank 17. A valve 18 controls flow from the discharge of each of the vessels to the header 16, and in the present instance valve 18 associated with vessel 4 is open and the remainder of the valves 18 are closed. In mixer 17, concentrated aqueous ammonia is added to the circulating water to provide a solution containing 5% by weight of NH4OH. Suitable agitation is provided, as by air injected from pipe 19.

The ammonia solution prepared in mixer 17 is transferred to manifold 20 which communicates with each of the vessels through lines controlled by valves 21, of which only the valve 21 associated with vessel 5 is open. Valves 15 following vessels 5 and 6 are open to permit the ammonia base exchange solution to flow in series through vessels 5, 6 and 7. The liquid withdrawn from vessel 7 passes through open valve 22 to line 23 supplying a carbonator 24. Carbon dioxide is injected to the bottom of carbonator 24 as a fine dispersion and the bubbles of gas are absorbed by the aqueous ammonia to neutralize the same and acidify it to a pH value of about 4 to 4.5. The carbonator 24 is a closed vessel vented to a mercury seal 25 adjusted to a carbonator pressure of about two pounds per square inch (gauge).

The acidified solution is transferred from the bottom of carbonator 24 to a manifold 26 supplying vessel 8 through open valve 27 associated with said vessel 8. The valves 15 following vessels 8, 9 and 10 being open, the carbonic acid solution flows through vessels 8, 9, 10 and 11 in series and is then passed through open valve 28 to a waste pipe 29.

The gel is washed with the solutions indicated above over a total period of 25 hours, two and one-half hours at each of the ten stages. The oldest gel in the series is removed upon completion of its washing period and the fresh water diverted to the next succeeding vessel, each vessel in the series being moved up one place by manipulation of valves and a body of fresh gel being placed at the end of the series. The two vessels out of the washing cycle are emptied and refilled, being ready to assume the last place in the cycle at the proper time.

The sequence of treating gel so obtained is very favorable to a high degree of sodium removal and a low breakage of the gel on drying. It has been found that rapid change in environment of fresh hydrogel by immersion in a liquid having a composition varying substantially from the composition of the water contained in the pores of the gel results in excessive breakage of the gel upon drying. By the process described above, fresh hydrogel is contacted with aqueous liquid which has passed through and taken up soluble matter from a number of beds of hydrogel. The pH value of the wash water is also affected by passing through beds of gel and approaches that of the water in the gel at the last bed in the washing cycle. There is a sharp change in pH of wash water between vessels on either side of a step of adding something (e. g. ammonia or carbon dioxide) to the water. However, by the time a vessel of hydrogel passes through this transition, it has been aged in aqueous media to a degree which renders the sharp change innocuous.

In the order of treatment of a given bed of hydrogel, the gel is washed in succession with an acid solution containing hydrogen ions and generally a small amount of ammonium ions which lower the sodium content of the gel by zeolytic base exchange; replacing the sodium with hydrogen and, perhaps, some ammonium radicals. The hydrogel is then scavenged of the major portion of the remaining sodium by zeolytic base exchange in an alkaline solution containing ammonium ions. The treated gel is then washed with progressively purer water until it is receiving fresh water directly and after a period in that condition is ready for drying and such activation as may be desired for the use for which it is intended.

The order of treatment with carbonic acid and ammonia described above may be reversed, treating first with ammonia, followed by treatment with carbonic acid as scavenging agent. The order described above and shown in the drawings is preferred because ammonia appears to be a more effective scavenging agent.

EXAMPLE II

The same equipment and sequence of steps is employed in the treatment of dried gel, except that the gel is first treated to condition it for the treatment. When the carbonic acid wash is first, the gel is swept with a slowly moving stream of carbon dioxide under any suitable pressure before immersion in carbonic acid. Since increased pressure appears to yield no real advantage, a pressure is generally used which exceeds atmospheric by a sufficient margin to induce the desired rate of flow. The carbon dioxide replaces the air or other gas in the gel pores and the displaced gas is swept out of the bed of gel in the stream of carbon dioxide. The tendency to breakage on wetting may be overcome by the use of any gas readily soluble in water but use of a gas corresponding to that dissolved in the treating medium is preferred. The advantages in time of treatment for the desired degree of base exchange may be capable of explanation on an assumption that the gas becomes effective for base exchange by reason of water adsorbed in the gel; however, this theory cannot be proven on the basis of available data.

In the same manner, dry gel is first treated with ammonia gas when the order of the treating solutions is reversed. The ammonia treated gel is then immersed in a solution containing ammonium ions and carried through the treatment outlined above.

The effect of treating gels with weak acids is demonstrated by the following examples describing treatment of hydrogel beads prepared according to the disclosure of the above noted Marisic patent.

EXAMPLE III

The hydrogel was base exchanged with aluminum sulfate solution, water washed and then scavenged for residual sodium by washing with carbonic acid. In the scavenging operation, carbonic acid was prepared by flowing the wash water downwardly through a vertical vessel and bubbling carbon dioxide into the bottom. The system was maintained under a pressure of about two inches of mercury. The carbonic acid solution (pH 4.1) was passed downwardly through a bed containing four liters of gel at ten cc. per minute for about 1½ days at room temperature. The gel was then dried in an atmosphere of circulating superheated steam at 250° F. and then heated in a muffle to 1050° F. at the rate of 3° F. per minute. After tempering at 1050° F. for one hour, the gel was found to be an efficient catalyst for the cracking of hydrocarbons. The sodium content of the finished catalyst was 0.11% by weight. This constitutes removal of more than 20% of the sodium in the gel before scavenging.

EXAMPLE IV

Two samples of fresh gel which had received no treatment for removal of soluble matter and zeolytic sodium were washed for 26 and 45 hours respectively with carbonic acid of pH 3.9 to 4.1. The fresh gel as submitted to treatment contained 13.3% sodium by weight (dry basis). The two base exchanging treatments described reduced this to 0.90% and 0.4%, respectively.

EXAMPLE V

The process is also effective in connection with gel which has been previously dried. A sample of finished bead cracking catalyst prepared according to the said Marisic patent, including base exchange with aluminum sulfate solution, water washing, drying and tempering at 1100° F. was divided into five portions. Portion 1 was used on a basis of comparison. Portions 2 and 3 were subjected to treatment with carbon dioxide gas passed therethrough for 1 hour at room temperature. They were then washed at room temperature with 11,000 cc. of aqueous medium at room temperature for three days (2.5 cc. per minute). Portion 2 was treated with water, while portion 3 was treated with a saturated aqueous solution of carbon dioxide (pH about 4). Portions 4 and 5 were similarly handled in ammonia treatments; i. e. $NH_3$ gas for one hour followed by treatment of portion 4 with water and portion 5 with 1% ammonium hydroxide solution at the rate mentioned above. The following table shows the results obtained. Significantly, the breakage was substantially less in the carbonic acid treated portion than in the corresponding water treated portion.

*Table 1*

| Portion | Gas Treatment | Aqueous Wash | Sodium, percent wt. on dry basis |
|---|---|---|---|
| 1 | none | none | 0.24 |
| 2 | CO$_2$ | water | 0.18 |
| 3 | CO$_2$ | H$_2$CO$_3$ | 0.06 |
| 4 | NH$_3$ | water | 0.19 |
| 5 | NH$_3$ | NH$_4$OH | 0.11 |

EXAMPLE VI

A sample of bead alumina-silica catalyst for cracking hydrocarbons was prepared in conventional manner for comparison with the succeeding examples. The gel was formed at pH 8.4 with 7.2% by weight of solids in the gel. After aging four days in water at room temperature, 3500 cc. of the gel was treated with 1400 cc. of solution containing 3 theoretical weights of aluminum sulfate for eight hours. The treatment was repeated and the gel was then dried slowly and tempered at 1100° F. Its effectiveness as a cracking catalyst and other properties are shown below in Table 2.

EXAMPLE VII

Another 3500 cc. sample of the hydrogel beads described in Example VI was aged 4 days in water at room temperature, washed twice for 8 hours with the aluminum sulfate solution of Example VI and scavenged by one application of boric acid solution for twenty-four hours. The solution employed consisted of 60 grams of H$_3$BO$_3$ in 1400 cc. of water (pH 3.8).

EXAMPLE VIII

Gel (3500 cc.) which had been aged two days in water at room temperature was washed twice for five hours with aluminum sulfate as in Example VI. This gel was then treated for 24 hours with 40 grams of boric acid in 1400 cc. of water.

EXAMPLE IX

The treatment of Example VIII was repeated, using 20 grams of boric acid in 1400 cc. of water for scavenging.

EXAMPLE X

A 3500 cc. sample of fresh gel was subjected to two treatments of six hours each with the aluminum sulfate solution of Example VI. It was then treated for eight hours with 1400 cc. of a 1.3% (wt.) solution of acetic acid.

The gels of Examples VI to X were all dried and tempered as described in Example VI and tested for cracking activity by contacting with gas oil at about 800° F. under identical conditions. Table 2 shows the properties of these catalysts.

*Table 2*

| Example | Scavenging Solution | Percent Vol. 410 E. P. Gasoline | Percent Na by wt. |
|---|---|---|---|
| 6 | none | 46.1 | .24 |
| 7 | 60 g. H$_3$BO$_3$/1400 cc. H$_2$O | 50.5 | .13 |
| 8 | 40 g. H$_3$BO$_3$/1400 cc. H$_2$O | 50.0 | .16 |
| 9 | 20 g. H$_3$BO$_3$/1400 cc. H$_2$O | 49.4 | .18 |
| 10 | 1.3% CH$_3$COOH | 47.5 | .12 |

I claim:

A process for the removal of zeolytic alkali metal from a dry inorganic oxide gel which comprises saturating said gel with carbon dioxide and thereafter washing said gel with an aqueous solution of carbonic acid for an extended period of time sufficient to effect substantial removal of zeolytic alkali metal from said gel.

ERNEST A. BODKIN.

REFERENCES CITED

The following references are of record in the file of this patent:

UNITED STATES PATENTS

| Number | Name | Date |
|---|---|---|
| 1,831,673 | Liebknecht | Nov. 10, 1931 |
| 1,835,420 | Neundlinger | Dec. 8, 1931 |
| 2,331,338 | Michael et al. | Oct. 12, 1938 |
| 2,197,862 | Hyman | Apr. 23, 1940 |
| 2,229,353 | Thomas | Jan. 21, 1941 |
| 2,283,172 | Bates | May 19, 1942 |
| 2,326,323 | Benedict | Aug. 10, 1943 |
| 2,346,657 | Bloch et al. | Apr. 18, 1944 |
| 2,385,217 | Marisic | Sept. 18, 1945 |
| 2,390,272 | Riesmeyer | Dec. 4, 1945 |
| 2,406,614 | Lee | Aug. 27, 1946 |
| 2,411,806 | Riesmeyer et al. | Nov. 26, 1946 |

FOREIGN PATENTS

| Number | Country | Date |
|---|---|---|
| 271,564 | Great Britain | May 25, 1927 |
| 595,859 | Germany | Apr. 23, 1934 |

OTHER REFERENCES

Behrman et al., "Effect of Low-pH Waters on Zeolites," Industrial & Engineering Chemistry, vol. 28, No. 11, pages 1279–1282 (1936).

King et al., "Industrial & Engineering Chemistry," vol. 31, No. 6 (1939), pages 727–728.

Certificate of Correction

Patent No. 2,480,628 August 30, 1949

ERNEST A. BODKIN

It is hereby certified that error appears in the printed specification of the above numbered patent requiring correction as follows:

Column 6, line 56, for "0.4%" read *0.41%*;

and that the said Letters Patent should be read with this correction therein that the same may conform to the record of the case in the Patent Office.

Signed and sealed this 14th day of February, A. D. 1950.

[SEAL]

THOMAS F. MURPHY,
*Assistant Commissioner of Patents.*